Figure 6:
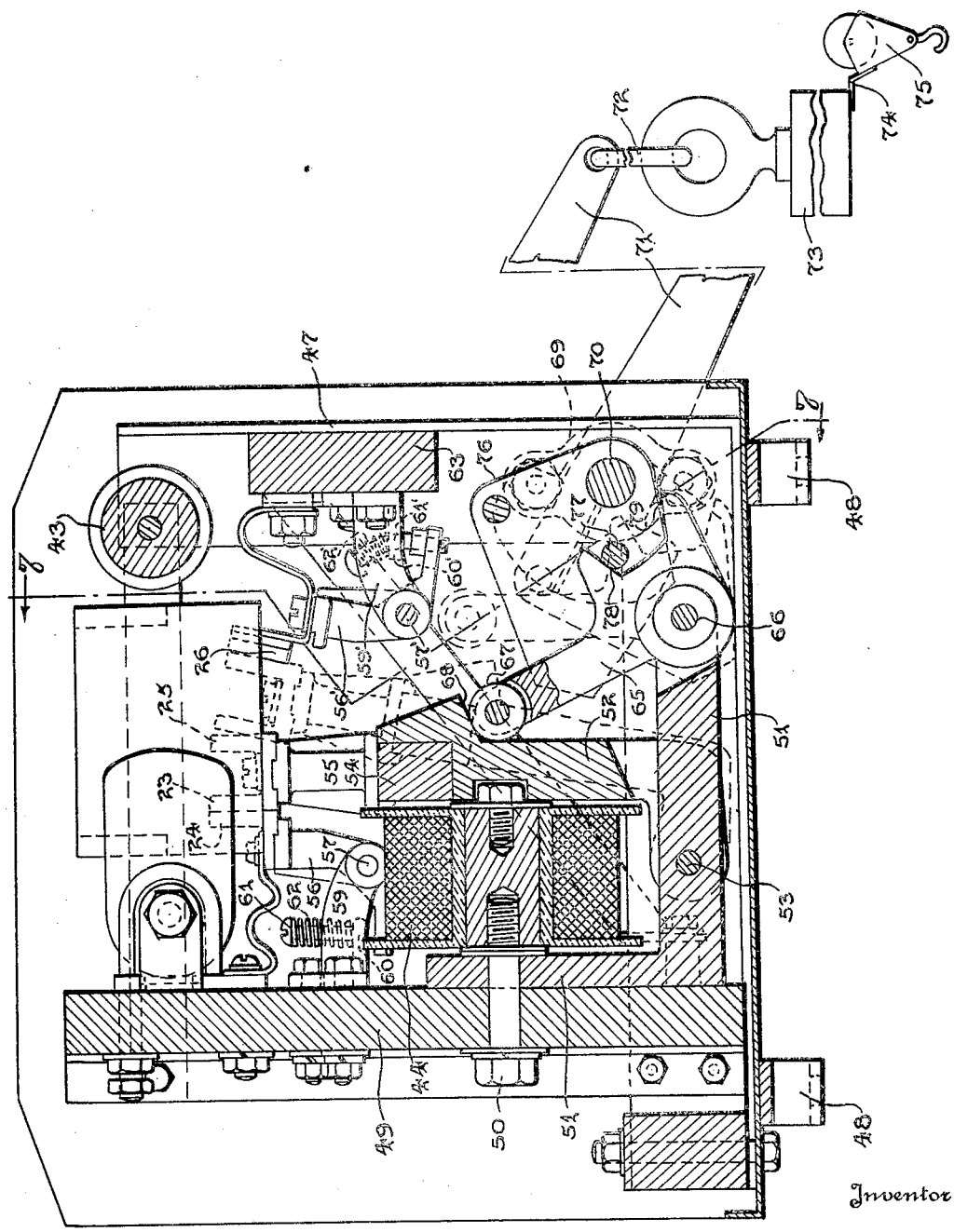

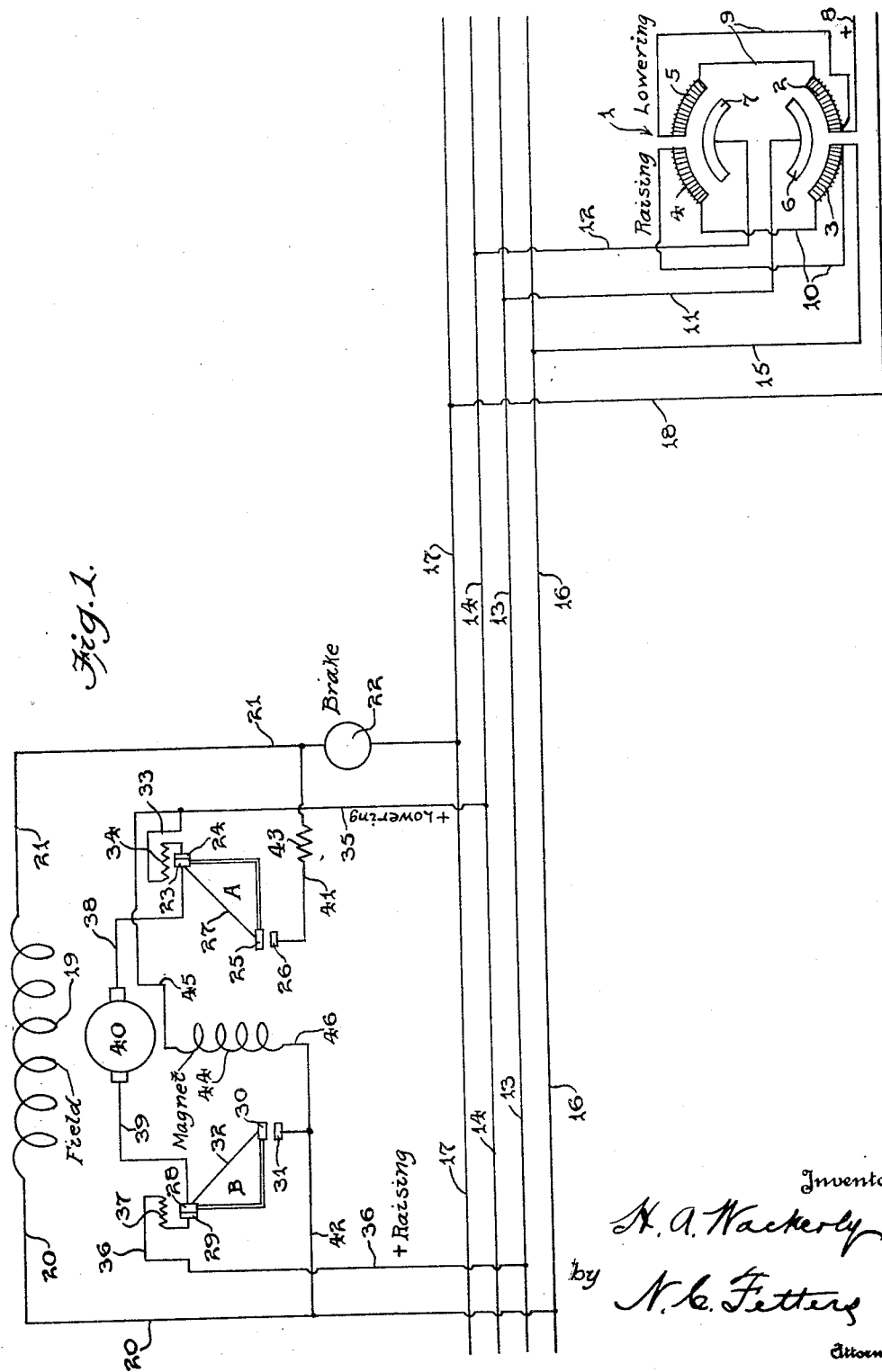

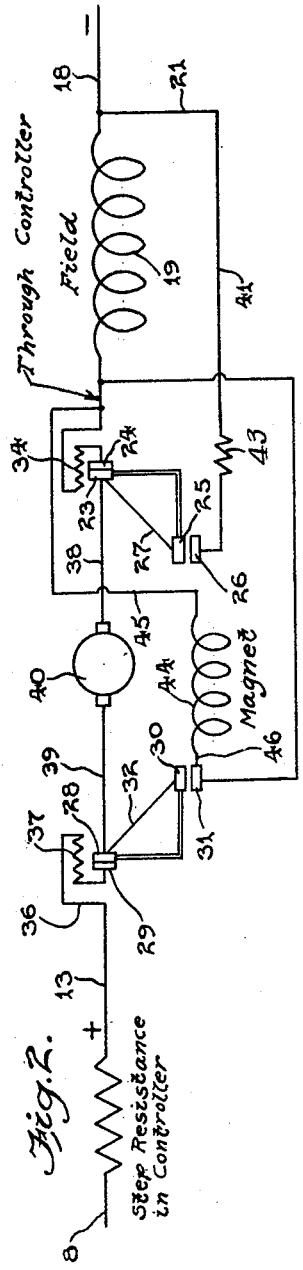
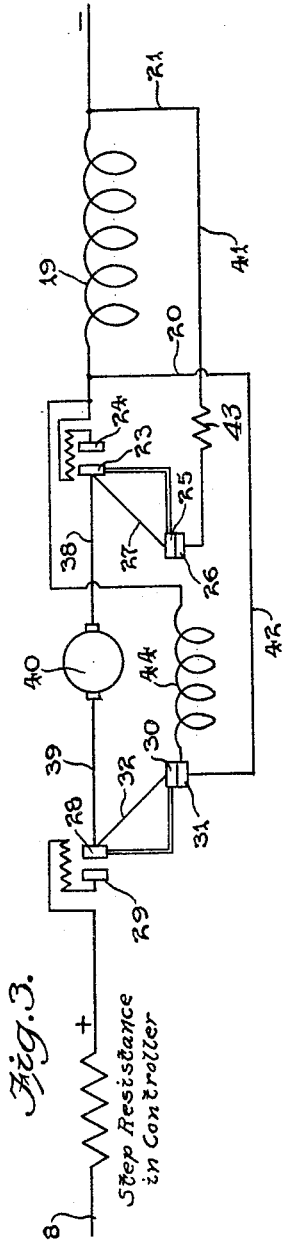
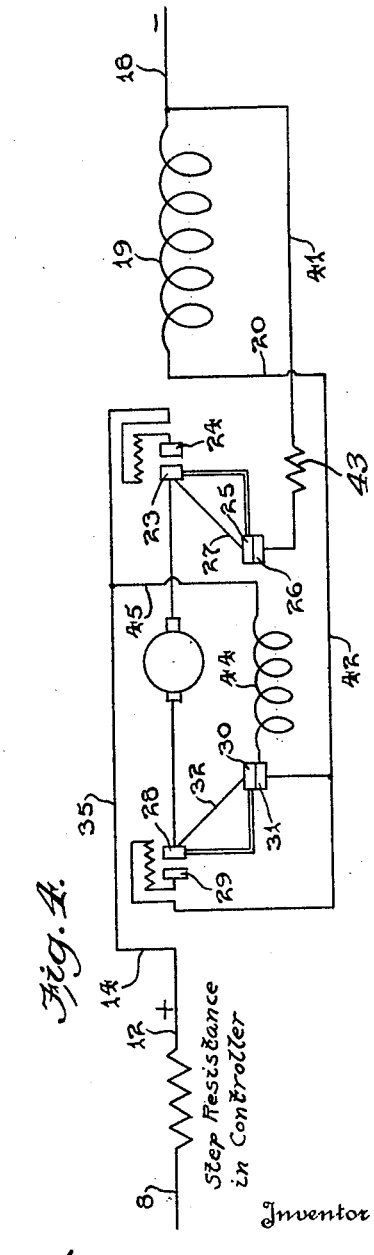

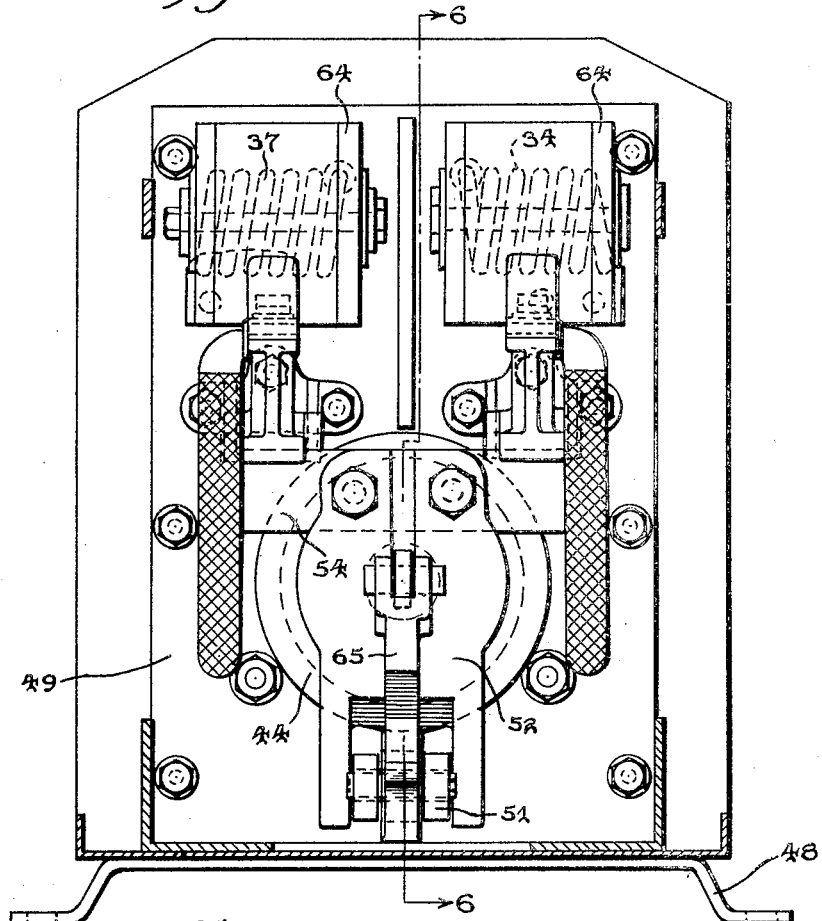
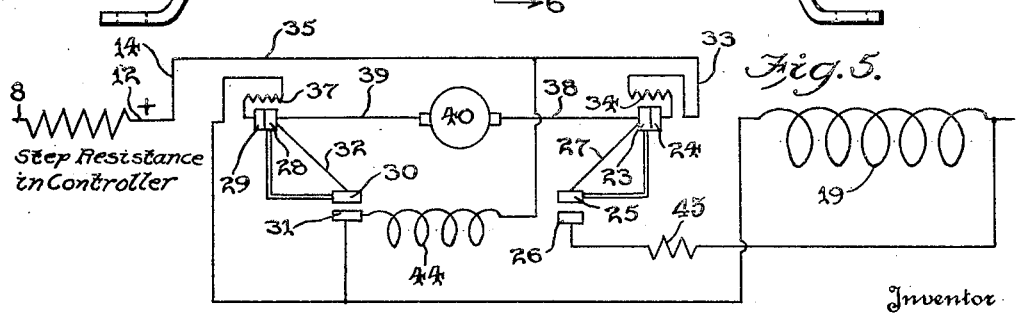

May 2, 1933. H. A. WACKERLY 1,906,889
ELECTRIC MOTOR CONTROL SYSTEM
Filed March 23, 1931   4 Sheets-Sheet 4

Inventor
H. A. Wackerly
By N. C. Fetters
Attorney

Patented May 2, 1933

1,906,889

UNITED STATES PATENT OFFICE

HARRY A. WACKERLY, OF ALLIANCE, OHIO, ASSIGNOR TO THE MORGAN ENGINEERING COMPANY, OF ALLIANCE, OHIO

ELECTRIC MOTOR CONTROL SYSTEM

Application filed March 23, 1931. Serial No. 524,695.

This invention relates to electric motor control systems of the type shown in my United States Patents Nos. 1,388,906 and 1,756,714, granted on August 30, 1921, and April 29, 1930, respectively, said systems being particularly adapted for use in connection with hoisting mechanism to automatically prevent the load from being lifted beyond a predetermined height.

In systems of this character the control of the hoisting motor is effected by switches commonly known as "limit switches" which are automatically tripped by mechanism operated by the hoisting device when the load reaches a predetermined height beyond which further lifting would be dangerous, should the operator fail to stop the motor at this time. Means are provided for creating a dynamic braking condition for the armature of the motor when the limit switches are tripped and also for restoring them to running condition, in a reversed sense when it is desired that the load be lowered.

In the systems of my prior patents one or both of the gaps created between the contacts of the limit switches when they are shifted to the dynamic braking position are bridged by resistances, which means that even in this condition current from the line is flowing through the motor and the controller. Furthermore, in the limit switch mechanism of these patents it was necessary in view of the circuit arrangements to provide for the successive operation of the switches, which requires a special arrangement and careful adjustment in order that they may function in proper timed relation.

It is an object of this invention to overcome the disadvantages of the systems of my prior patents by providing a motor control system that is of simpler character and more economical to construct and operate than those shown therein.

In general the invention eliminates the use of any resistances across the gaps of the limit switches, so that when they are tripped and assume the dynamic braking position the motor is completely cut off from the source of current and the magnet which restores the limit switches to their running condition is deenergized and can only be energized when the controller is actuated to reverse the current through the armature of the motor. Thus all danger of the load being further lifted after the switches have been tripped will be positively eliminated. The switches are arranged to be closed simultaneously instead of successively thus simplifying the structure of the apparatus and making it more certain of operation in its intended manner.

The particular nature of the invention as well as other objects and advantages thereof will appear most clearly from a description of a preferred embodiment thereof as shown in the accompanying drawings in which, Fig. 1 is a complete wiring diagram of an application of the invention to a motor driven hoisting apparatus, Figs. 2 to 5 inclusive, are simplified wiring diagrams showing in each case only the circuit elements essential to the operation of the system under the various conditions represented by the diagrams, Fig. 6 is an elevation in section along the line 6—6 of Fig. 7 showing the mechanism of the limit switch, and Fig. 7 is a similar view taken in section substantially along the line 7—7 of Fig. 6, parts being omitted for the sake of clearness.

In Fig. 1, 1 represents generally a controller for the system, which may be of any suitable reversible type and is shown herein as including arcuate resistance units 2, 3, 4 and 5, and contact plates 6 and 7, it being understood that an arm, not shown, coacts with the units and plates to vary the current through the controller and reverse it as desired. One terminal of unit 2 is connected to the + side of a suitable supply line by a conductor 8. Units 2 and 5 on the one hand and 3 and 4 on the other hand are connected by a plurality of conductors 9 and 10 respectively, in a manner well known, in order that the circuits may be completed through the controller as will be hereinafter described in more detail.

From plates 6 and 7 conductors 11 and 12 respectively lead to conductors 13 and 14 respectively which lead to other conductors leading to the limit switch mechanism. From unit 3 a conductor 15 leads to a conductor 16 and from a conductor 17 a conductor 18 leads to the − side of the supply line.

The field 19 of the motor of the hoist is connected between conductors 16 and 17 by conductors 20 and 21 respectively, the latter passing through a suitable brake 22. The armature circuit of the motor is taken off from the conductors 13 and 14 and passes through the contacts of the limit switches designated generally as A and B. The former consists of a pair of coacting contacts 23 and 24 and another pair 25 and 26, contacts 23 and 25 being jointly movable and electrically connected by a conductor 27 while contacts 24 and 26 are relatively fixed. The limit switch B is similar and has pairs of coacting contacts 28 and 29 and 30 and 31, contacts 28 and 30 being the movable ones connected by a conductor 32 and contacts 29 and 31 being the relatively fixed ones.

From fixed contact 24 of limit switch A a conductor 33 leads through a suitable blow-out coil 34 to a conductor 35 leading to conductor 14. From fixed contact 29 of limit switch B a conductor 36 leads through a blow-out coil 37 to conductor 13. The movable contacts 23 and 28 of the limit switches are connected by conductors 38 and 39 respectively to the terminals of the armature 40. The fixed contacts 26 and 31 of the limit switches are connected by conductors 41 and 42 respectively to conductors 21 and 20 respectively. Conductor 41 includes a resistance 43. An electro-magnet 44 for actuating the limit switches under certain conditions is connected by conductors 45 and 46 with conductor 35 and contact 31 respectively.

Referring to Figs. 6 and 7 which show the details of the limit switches, 47 in a casing provided with suitable supporting lugs 48 and a panel board 49 to which is attached the electro-magnet 44 by a bolt 50 which also holds in place the end of a bracket 51. The armature 52 of the electro-magnet is pivotally mounted on the bracket as at 53 and carries a transverse bar 54 formed of any suitable insulating material. Near each end of the bar is attached a pedestal 55 which carries at its upper end a U-shaped contact member. One of these contact members corresponds to the connected movable contacts 23 and 25 of limit switch A in Fig. 1 and is correspondingly numbered, while the other one corresponds to the similar parts of limit switch B. The co-acting fixed contacts of Fig. 1 are also shown in detail in Figs. 6 and 7. For instance, each of contacts 24 and 28 is connected to a lever 56 pivoted at 57 in a bracket 59 attached to panel board 49. The bracket is provided with a lug 60 through which passes a pin 61 attached to the lever and having a head to act as an abutment for a spring 62 surrounding the pin, the lug acting as the other abutment. This construction permits the fixed contacts to yield slightly when engaged by the corresponding movable contacts, insures firm engagement between their contacting surfaces and causes a slight wiping action as they engage each other.

A similar construction is used for the other fixed contacts 26 and 31 as indicated at 56′, 57′, 59′, 60′, 61′ and 62′. These elements are mounted on a small panel board 63 attached to the casing 47. I prefer to make each of the coacting contacts 23 and 24 and 28 and 29 of copper, and the contacts 25 and 26 and 30 and 31 of copper and carbon.

The blow-out coils 34 and 37 are provided with shields 64 attached to their cores. The resistance 43 is also mounted on the casing 47.

For the purpose of holding the armature 52 in its normal position when the magnet 44 is de-energized and for permitting it to move to its retracted position under certain other conditions, there is provided a locking device consisting of an arm 65 pivoted at 66 on the bracket 51 and carrying a roller 67 at its free end co-acting with a shoulder 68 of the armature. Bearings 69 are located in the lower portion of the casing and support a shaft 70 to which is attached an arm 71 having at its outer end a cable 72 to which is attached a counter weight 73 adapted to be engaged by a part 74 of the hoisting mechanism 75 as is customary in devices of this character. The arm 71 carries a counterweight 76 having a pin 77 which moves between projections 78 and 79 of arm 65.

The operation of the apparatus will appear most clearly in connection with the simplified diagrams of Figs. 2 to 5 inclusive. Assuming that the load is to be lifted and that the parts are as shown in Figs. 6 and 7 and with the contacts 23 and 24 in engagement as are also contacts 28 and 29, the arm of the controller will be brought into engagement with resistance units 2 and 4 and suitably manipulated to obtain the power in the motor necessary to lift the load. The raising circuit thus established may be traced on Fig. 1 as follows. From + terminal, conductor 8, unit 2, one end of arm of controller, plate 6, conductors 11, 13 and 36, blow-out coil 37, engaging limit switch contacts 29 and 28, conductor 39, armature 40 of hoisting motor, conductor 38, engaging limit switch contacts 23 and 24, blow-out coil 34, conductors 33, 35, 14, 12, plate 7, the other end of the arm of the controller, resistance units 4 and 3 via the conductors 10 between these units, conductors 15, 16 and 20, field 19, of the motor, conductor 21, including brake 22, and conductors 17 and 18 to − terminal. The armature and field will be connected in series and the former will rotate in a direction to lift the load. The conditions just described are shown in a simpler way in Fig. 2 wherein the elements are numbered correspondingly to Fig. 1. When the load reaches its limit of travel the part 74 will lift the counterweight 73 and the counterweight 76 over balances the weight of the cable 72 and its pin 77 coacting with projection 79 will throw the arm 65 away from the armature 52 allowing the latter to fall away from its attracted position, since the magnet 44 is not energized under these conditions.

It will be seen from Fig. 1 that at this time there is a shunt circuit around magnet 44, through conductors 35, 14 and 12, plate 7, corresponding end of arm of controller, unit 4, conductor 10, unit 3 and conductors 15, 16 and 20 to the point where it is joined by conductor 42. This circuit will be of sufficiently low resistance as compared with that of the magnet to be in effect a short circuit about the magnet. The contacts 23 and 24, and 28 and 29 are thus separated and the contacts 25 and 26 and 30 and 31 are engaged to establish a dynamic braking circuit which may be traced on Fig. 1 as follows. From armature 40, conductor 39, contact 28, conductor 32, contacts 30 and 31, conductor 42, conductor 20, field 19, conductors 21 and 41, including resistance 43, contacts 26 and 25, conductor 27, contact 23, and conductor 38 to the armature. The resistance 43 will prevent any excessive flow of current in this circuit and the motor will come to rest quickly even though the arm of the controller be in position for lifting the load or if the line voltage fails about the time the counter weight 73 is lifted by the motor. This dynamic braking circuit is shown in simplified form in Fig. 3.

When the load is to be lowered, the arm of the controller is moved to co-act with units 3 and 5 and the first result of this shifting of the arm is to establish the following circuit. Conductor 8, unit 2, conductor 9, unit 5, one end of arm of controller, plate 7, conductors 12, 14, 35 and 45, magnet 44, conductor 46, conductor 20, field 19, conductors 21, 17 and 18 to − terminal. This condition is shown in Fig. 4.

The magnet will then attract its armature to restore the contacts to the position for establishing a working circuit through the armature of the motor. This circuit may be traced in Fig. 1 as follows. From + terminal, conductor 8, unit 2, conductor 9, unit 5, one end of arm of controller, plate 7, conductors 12, 14, 35, 33, blow-out coil 34, contacts 24 and 23, conductor 38, armature 40, conductor 39, contacts 28 and 29, conductors 36, 13 and 11, plate 6, one end of arm of controller and unit 3, from which the circuit continues through the field 19 over the same elements as previously traced in connection with the raising of the load. The lowering condition is shown in simplified form in Fig. 5.

When the load begins to descend the counter weight 73 will soon be released and through the cable 72 will swing the arm 71 to lift the counter weight and through the pin 77 co-acting with projection 78 restore the arm 65 to its position to hold the armature 52 in its normal position.

I claim:—

1. In a motor control system, the combination with an electric motor, circuits therefor and reversible controlling means for said circuits, of a pair of limit switches, means operated by rotation of the motor in one direction for simultaneously actuating the switches to establish a circuit about the armature and field of the motor to brake the armature, and electrically controlled means for resetting the switches when the controlling means is operated to reverse the current in the armature.

2. In a motor control system, the combination with an electric motor, circuits therefor and reversible controlling means for said circuits, of a pair of limit switches, means operated by rotation of the motor in one direction for simultaneously actuating the switches to establish a circuit about the armature and field of the motor to brake the armature, electrically controlled means for resetting the switches when the controlling means is operated to reverse the current in the armature, and means under the control of the controlling means for preventing actuation of the electrically controlled means while the motor is operating in the first mentioned direction.

3. In a motor control system, the combination with an electric motor, circuits therefor and reversible controlling means for said circuits, of limit switches, means operated by rotation of the motor in one direction for actuating the switches to establish a circuit about the armature and field of the motor to brake the armature, an electro-magnet for resetting the switches when the controlling means is operated to reverse the current in the armature and means for establishing a shunt circuit about the electro-magnet while the motor is operating in the first mentioned direction to prevent it from affecting the switches.

4. In a motor control system, the combination with an electric motor, a source of current, circuits for the motor therefrom and reversible controlling means for said circuits, of limit switches, means operated by rotation of the motor in one direction for actuating the switches to simultaneously establish a circuit about the armature and field of the motor to brake the armature and to completely disconnect the armature and field from the source of current and electrically controlled means for resetting the switches when the controlling means is operated to reverse the current in the armature.

5. In a motor control system, the combination with an electric motor, a source of current, circuits for the motor therefrom and reversible controlling means for said circuits, of limit switches, means operated by rotation of the motor in one direction for actuating the switches to simultaneously establish a circuit about the armature and field of the motor to brake the armature and to completely disconnect the armature and field from the source of current, electrically controlled means for resetting the switches when the controlling means is operated to reverse the current in the armature, and means under the control of the controlling means for preventing actuation of the electrically controlled means while the motor is operating in the first mentioned direction.

6. In a motor control system, the combination with an electric motor, a source of current, circuits for the motor therefrom and reversible controlling means for said circuits, of limit switches, means operated by rotation of the motor in one direction for actuating the switches to simultaneously establish a circuit about the armature and field of the motor to brake the armature and to completely disconnect the armature and field from the source of current, an electro-magnet for resetting the switches when the controlling means is operated to reverse the current in the armature and means for establishing a shunt circuit about the electro-magnet while the motor is operating in the first mentioned direction to prevent it from affecting the switches.

7. In a motor control system, the combination with an electric motor, circuits therefor and reversible controlling means for said circuits, of limit switches, means operated by rotation of the motor in one direction for actuating the switches simultaneously to establish a circuit about the armature and field of the motor to brake the armature and electrically controlled means for simultaneously resetting the switches when the controlling means is operated to reverse the current in the armature.

8. In a motor control system, the combination with an electric motor, circuits therefor and reversible controlling means for said circuits, of limit switches, means operated by rotation of the motor in one direction for actuating the switches simultaneously to establish a circuit about the armature and field of the motor to brake the armature, electrically controlled means for simultaneously resetting the switches when the controlling means is operated to reverse the current in the armature, and means under the control of the controlling means for preventing actuation of the electrically controlled means while the motor is operating in the first mentioned direction.

9. In a motor control system, the combination with an electric motor, circuits therefor and reversible controlling means for said circuits, of limit switches, means operated by rotation of the motor in one direction for actuating the switches simultaneously to establish a circuit about the armature and field of the motor to brake the armature, an electro-magnet for simultaneously resetting the switches when the controlling means is operated to reverse the current in the armature and means for establishing a shunt circuit about the electro-magnet while the motor is operating in the first mentioned direction to prevent it from affecting the switches.

In testimony whereof, I have signed this specification.

HARRY A. WACKERLY.